United States Patent [19]

Konishi et al.

[11] 4,264,951
[45] Apr. 28, 1981

[54] DC POWER TRANSMISSION CONTROL

[75] Inventors: Hiroo Konishi; Hisao Amano, both of Hitachi, Japan

[73] Assignee: Hitachi, Ltd., Tokyo, Japan

[21] Appl. No.: 47,749

[22] Filed: Jun. 12, 1979

[30] Foreign Application Priority Data

Jun. 14, 1978 [JP] Japan .................................. 53-70868

[51] Int. Cl.$^3$ .............................................. H02J 3/36
[52] U.S. Cl. ......................................... 363/35; 363/51
[58] Field of Search ......................... 363/34, 35, 51, 79

[56] References Cited

U.S. PATENT DOCUMENTS

4,210,956  7/1980  Watanabe ............................... 363/51

*Primary Examiner*—William M. Shoop
*Attorney, Agent, or Firm*—Craig and Antonelli

[57] ABSTRACT

A pair of thyristor converters are connected by a DC power transmission line, and their AC terminals are connected through tapped transformers to AC systems respectively. The output signal of a constant-current circuit in a converter control unit associated with the forward converter is selected to control the gate of the forward converter, while the output signal of a constant-voltage circuit in a converter control unit associated with the reverse converter is selected to control the gate of the reverse converter. When the reactive power is to be controlled, a reactive power signal is applied for the gate control. A voltage limit indication circuit in each control unit receives the AC terminal voltage $e_2$ of the transformer and the DC current $I_d$ so as to increase the control angle limit with a decrease in the values of $e_2$ and $I_d$. When the control advance angle or control delay angle determined by the output signals of the control circuits is larger than the control angle limit, this angle is limited to the control angle limit. When the reactive power is to be controlled, the tap position of either transformer is lowered to decrease $e_2$ and to increase the control angle limit thereby widening the controllable range of the reactive power. During the start-stop stage or during the protective operation, the output of the voltage limit indication circuit in each control unit is inhibited to permit free variations of the control angle.

29 Claims, 11 Drawing Figures

DC POWER TRANSMISSION CONTROL

BACKGROUND OF THE INVENTION

This invention relates to an apparatus for controlling the control angle for AC-DC thyristor converters in a DC power transmission system while maintaining the damping losses of damping circuits in the converters to less than a predetermined limit, and more particularly to a DC power transmission control apparatus which is capable of exhibiting a maximum control function for the contro. of the reactive power.

Briefly describing, a DC power transmission system is a means for interconnecting two AC systems by a DC power transmission line and comprises AC-DC converters for the mutual conversion between the AC power and the DC power. In the DC power transmission system, one of the thyristor converters operates as a forward converter or a rectifier, while the other operates as a reverse converter or an inverter, and for example, the rectifier is placed under constant current control, while the inverter is placed under constant voltage control or constant extinction angle control so as to permit interchange of power between the two AC systems.

When looked from the side of the electric generator in any one of the AC systems, the AC-DC converter is a load with a retarded power factor which is adjustable. Thus, the AC-DC converter can also serve the function of controlling the reactive power in the AC system in addition to the power conversion function above described. Especially, when the electric generator is connected to a large-capacity cable system, a super-high voltage transmission system or a long-distance power transmission line, the operation of the generator with an advanced phase becomes a matter of consideration in a light loaded condition, but this problem can be obviated by the reactive power control function of the converter.

This reactive power control function will be explained in more detail. Now, the active power and reactive power in the output of the generator connected to the load are designated by $P_g$ and $Q_g$, those of the converters are designated by $P_i$ and $Q_i$, and those of the load are designated by $P_l$ and $Q_l$, respectively. Then, in the AC system connected to the reverse converter or inverter, the relations $P_g = P_l - P_i$ and $Q_g = Q_i + Q_l$ hold. Suppose then that the active power $P_l$ of the load is constant, and the retarded(delay)-phase reactive power load $Q_L$ decreases. In such a case, the generator is inevitably placed in an advance phase operation. Such as operation of the generator can be avoided by detecting the power factor of the generator and increasing the control angle $\beta$ for the reverse converter so as to increase the consumption of the reactive power $Q_i$. The above description has referred to the effectiveness of the reactive power control by the converter for the purpose of avoiding the advance phase operation of the generator. This is also effective in controlling the voltage in the AC system to be constant. For example, by increasing the reactive power consumed by the converter connected to the AC system operating with an advanced power factor, the AC voltage at the AC-DC connection point decreases, while by decreasing the reactive power consumed by the converter, the AC voltage at the connection point increases. The above fact can be utilized for the AC voltage control. Further, the above manner of reactive power control in the AC system by the converter is advantageous in that the reactive power can be controlled at a high speed. From the viewpoint of utilizing the converter for the above purpose, it can be said that the larger the reactive power controlled by the converter, the greater is the rate of contribution to the improvement in the stability of the AC system.

The reactive power consumed by the converter is approximately expressed by the following equation (1):

$$Q = \sqrt{3} \, e_2 \cdot \frac{\sqrt{6}}{\pi} I_d \sin \phi \tag{1}$$

where
- $Q$: reactive power
- $e_2$: AC voltage at AC terminal of converter
- $I_d$: DC current at DC terminal of converter
- $\pi$: ratio of circumference of circle to its diameter In the equation (1), $\phi$ is given as follows:

$$\phi = \cos^{-1}\left(\frac{\cos\alpha + \cos(\alpha + u)}{2}\right) \tag{2}$$

$$\phi = \cos^{-1}\left(\frac{\cos\gamma + \cos\beta}{2}\right) \tag{3}$$

where
- $\phi$: power factor angle (phase difference between AC current and AC voltage)
- $\alpha$: control delay angle
- $\beta$: control advance angle
- $u$: commutation angle
- $\gamma = \beta - u$: extinction angle The value of Q obtained by introducing the value of $\phi$ given by the equation (2) into the equation (1) provides the reactive power consumed by the forward converter, and the value of Q obtained by introducing the value of $\phi$ given by the equation (3) into the equation (1) provides the reactive power consumed by the reverse converter. It will be apparent from the equations (1), (2) and (3), the larger the control delay angle $\alpha$ or the control advance angle $\beta$, the greater is the reactive power consumed by the converter, provided that the AC voltage $e_2$ and DC current $I_d$ are constant, and $\phi < \pi/2$ radians.

However, even when the value of $\phi$ lies within the range of $\phi < \pi/2$ radians, there is a limit in the increase of the control angles $\alpha$ and $\beta$ for the purpose of control of the reactive power. The reasons will be described presently. The thyristor converter comprises a plurality of thyristors connected in series to constitute a plurality of groups, and a series circuit of a resistor R and a capacitor C, or a so-called damping circuit, is connected across the anode and the cathode of each thyristor or each thyristor group so as to prevent potential fluctuation and other troubles during commutation of the thyristors. In this circuit, there occurs normally a loss given approximately by $(R \cdot I_d{}^2 + \frac{1}{2} C \, e_2{}^2)$, and this loss increases with the increase in the control angles $\alpha$ and $\beta$. Therefore, with the increase in the control angles $\alpha$ and $\beta$, the efficiency of conversion is reduced, and the heat generated from the thyristor valves becomes excessive until finally it is not negligible. Further, when it is desired to operate the converter continuously within the control angle range in which $\alpha$ and $\beta$ have large values, the resistors R and capacitors C having the capacities enough to compensate the damping losses of the damping circuits are required, and the proportion of the space occupied by the damping circuits in the thyristor values increases considerably, resulting in a bulky converter which is undesirable. The relation between the control angles of the damping loss of the converter is disclosed in, for example, a paper entitled "Calculation of Damper Losses in HVDC Converters" IEEE Summer Power Meeting, Dalla, Texas, June 22–27, 1969.

As described hereinbefore, the positive utilization of AC-DC thyristor converters for the reactive power control provides a remarkable merit in view of their dual control functions. However, in the present status of the reactive power control, the damping loss in the thyristor valves is not entirely taken into account although the above problem is encountered in the effort of increasing the reactive power consumed by the converter. The neglect of the above problem in the present status of the reactive power control gives rise to various problems including an undesirable reduction in the conversion efficiency of the converter and an undesirable generation of excessive heat from the thyristor valves. Further, due to the fact that the present status is as described above, no efforts have so far been made to attain the desired reactive power control by fully exhibiting the reactive power control function of the converter within the control angle range which will not increase the damping loss.

While the above description has referred to the problems encountered in the reactive power control when the control angles are maintained at large values for an extended period of time of operation by way of example, such problems may occur also during operation at a low load, resulting also in an undesirable reduction in the efficiency of conversion.

SUMMARY OF THE INVENTION

With a view to obviate the prior art problems pointed out above, it is a first object of the present invention to provide a novel and improved DC power transmission control apparatus which is capable of limiting the damping loss of the thyristor valves to less than a predetermined limit.

A second object of the present invention is to provide an apparatus of the kind above described which can exhibit a maximum control function for the control of the reactive power while limiting the damper loss to less than the limit.

A third object of the present invention is to provide an apparatus of the kind above described which ensures a harmony between the reactive power control function and the other-control and protective functions of the AC-DC converters.

The apparatus according to the present invention comprises a control unit which calculates, on the basis of the DC current $I_d$ and AC voltage $e_2$, the control angle limits $\alpha_o$ and $\beta_o$ required for maintaining constant the damping loss of the thyristor valves, so that the control angles $\alpha$ and $\beta$ for the AC-DC converters may not exceed these limits $\alpha_o$ and $\beta_o$ respectively.

BRIEF DESCRIPTION OF THE DRAWINGS

FIGS. 3a to 3c are graphs illustrating the operation of the limiter in the converter control unit of the present invention, in which

FIGS. 4a and 4b are circuit diagrams of an embodiment of the present invention which controls the control angles for the converters to control the reactive power, in which

DESCRIPTION OF THE PREFERRED EMBODIMENTS

Figure 1:
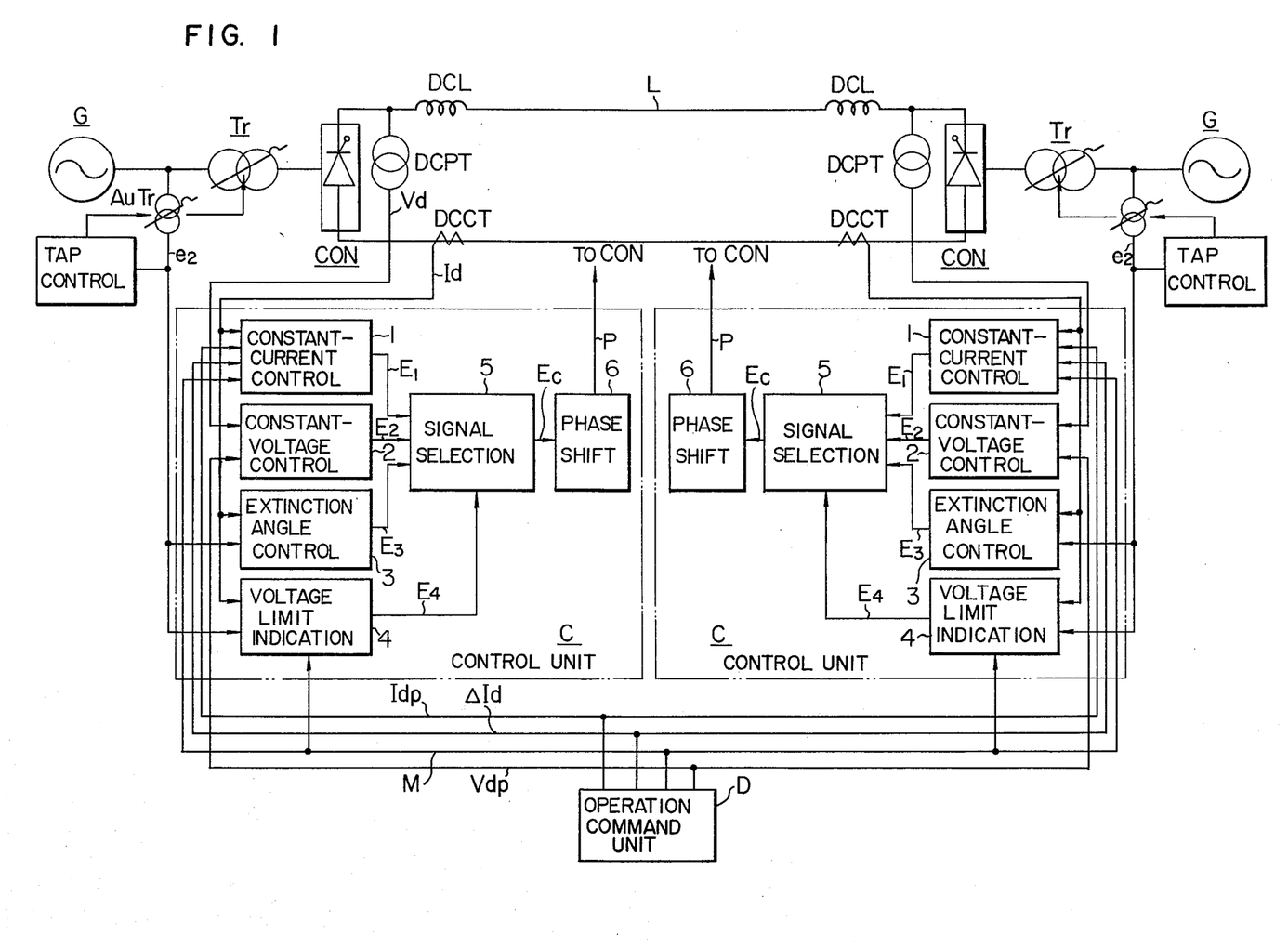
FIG. 1 is a diagrammatic view showing a DC power transmission system to which the present invention is applicable and also showing the structure of the converter control units according to the present invention.

Referring to FIG. 1, a DC power transmission system is controlled by the control apparatus according to the present invention. The DC power transmission system includes a pair of thyristor converters CON, a pair of DC reactors DCL and a power transmission line L, and the AC terminals of the thyristor converters CON are connected through tapped transformers $T_r$ to two AC power systems G respectively. A converter control unit C is provided for each of the thyristor converters CON and comprises known parts 1, 2, 3, 5 and 6 except a limiter 4. Each control unit C receives a DC voltage $V_d$ from an associated DC power transformer DCPT, and a DC current $I_d$ from an associated DC current transformer DCCT. The AC voltage $e_2$ at the converter-side terminal of the associated transformer Tr (which voltage is referred to hereinafter as an AC terminal voltage) is also applied to the control unit C through an associated tapped auxiliary transformer Au·Tr. The forward converter CON is placed under constant current control, while the reverse converter CON is placed under constant voltage control. An operation command unit D applies a current setting signal $I_{dp}$, a current margin signal $\Delta I_d$, a voltage setting signal $V_{dp}$ and an operation mode signal M to each of the control units C.

Each control unit C comprises a constant-current control circuit 1, a constant-voltage control circuit 2, an extinction angle control circuit 3, a voltage limit indication circuit 4, a signal selection circuit 5, and an automatic pulse phase shift circuit 6.

The constant-current control circuit 1 acts to maintain constant the DC current $I_d$ and generates a control voltage signal $E_1$ required for satisfying the relation $I_{dp}-I_d=0$. When, however, the associated converter CON is instructed to operate as an inverter by the operation mode signal M applied from the operation command unit D, this circuit 1 generates a control voltage signal $E_1$ which satisfies now the relation $I_{dp}-\Delta I_d - I_d = 0$ which includes the current margin signal $\Delta I_d$.

The constant-voltage control circuit 2 generates a control voltage signal $E_2$ required for satisfying the relation $V_{dp}-V_d=0$. The extinction angle control circuit 3 calculates, on the basis of $I_d$ and $e_2$, a minimum control angle (an advance angle) required for the stable operation of the associated converter CON when this converter operates as an inverter, and generates a control voltage signal $E_3$ indicative of such a control angle. The control circuits 1, 2 and 3 described above are well known in the art, and any detailed description is therefore unnecessary.

The voltage limit indication circuit 4 is a circuit added to the known circuits 1, 2 and 3 in each of the converter control units C according to the present invention, and will be described in detail later with reference to FIG. 2. Briefly describing, this circuit 4 generates a control voltage signal $E_4$ corresponding to the limit $\alpha_o$ or $\beta_o$ of the control angle $\alpha$ or $\beta$ determined by the damping circuit loss. The signal selection circuit 5 selects a minimum voltage signal among the control voltage signals $E_1$, $E_2$ and $E_3$. When the control angles $\alpha$ and $\beta$ are larger than the limits $\alpha_o$ and $\beta_o$ determined by the output $E_4$ of the circuit 4, the circuit 5 selects the signal $E_4$ so as to limit the control angles $\alpha$ and $\beta$ to their limits $\alpha_o$ and $\beta_o$. One of the voltage signals thus selected appears from the circuit 5 as its output signal $E_c$. The automatic pulse phase shift circuit 5 is of the type well known in the art and generates an output signal P indicative of the firing phase determined by the output $E_c$ of the circuit 5. A tap control unit TP is associated with each AC system G to change the tap positions of the transformers Tr and Au·Tr in interlocking relation. Consequently, the output $e_2$ of the auxiliary transformer Au·Tr represents the voltage of the level proportional to the no-load voltage of the transformer Tr at the terminal connected to the converter CON.

The above description clarifies substantially the structure of the control units C according to the present invention. In order to facilitate the understanding of the later description, the relation between the control voltage $E_c$ and the control angle $\alpha$ or $\beta$ will be described with reference to FIG. 3a in which the horizontal axis represents the control voltage $E_c$ and the vertical axis represents the control angles $\alpha$ and $\beta$. It will be seen from FIG. 3a that their is a linear relation therebetween such that the control delay angle $\alpha$ increases and the control advance angle $\beta$ decreases with the increase in the control voltage $E_c$. As is commonly known, the converter operates as a forward converter within the region of $\alpha \leq 90°$ and as a reverse converter within the region of $\alpha > 90°$.

Figure 3A:
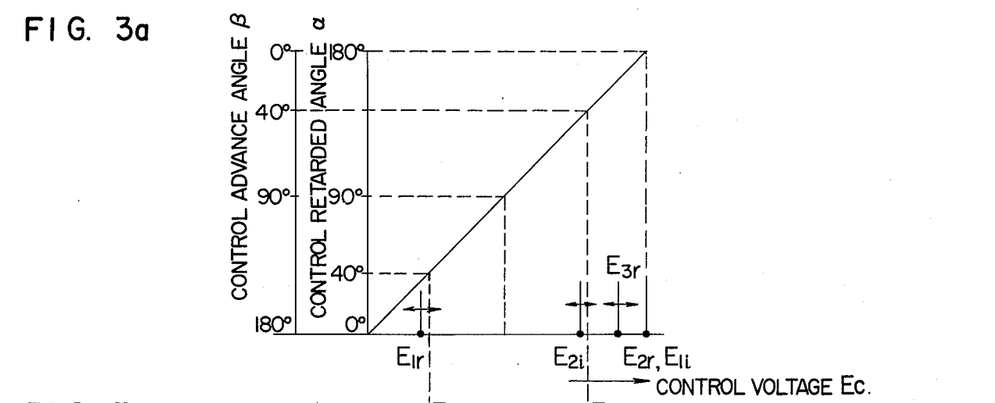
FIG. 3a shows the relation between the control voltage $E_c$ and the control angles $\alpha$ and $\beta$.

The relative levels of the control voltages $E_1$, $E_2$, $E_3$ and $E_4$ will also be described with reference to FIG. 3a. The output $E_1$ ($E_{1r}$) of the circuit 1 in the control unit C associated with the converter operating as a forward converter is such that it satisfies the relation $I_{dp}-I_d=0$ and lies within the forward conversion region. The output $E_2$ ($E_{2r}$) of the circuit 2 in this control unit C is such that it satisfies the relation $V_{dp}-V_d=0$. That is, the DC voltage $V_{di}$ applied to the converter operation as an inverter is maintained at $V_{dp}$ due to the constant-voltage control described later, and the DC voltage $V_{dr}$ appearing from the converter operating as a rectifier is higher than $V_{di}$ by the amount of the line voltage drop. Thus, the relation $V_d > V_{dp}$ holds, and the operational amplifier in the circuit 2 saturates to provide a maximum value of its voltage output $E_{2r}$. Therefore, the delay angle $\alpha$ corresponding to such a value of $E_{2r}$ is close to $\alpha = 180°$. The output $E_3$ ($E_{3r}$) of the circuit 3 in the control unit C lies naturally within the inverter region since it is used to prevent commutation failure when the associated converter operates as an inverter. The output $E_3$ ($E_{3i}$) of the circuit 3 in the control unit C associated with the converter operating as an inverter lies also naturally within the inverter region. Therefore, in the control unit C associated with the forward converter, the signal $E_1$ providing a minimum value of $\alpha$ is selected for the constant-current control of the converter. The output $E_1$ ($E_{1i}$) of the circuit 1 in the control unit C associated with the converter operating as a reverse converter or inverter is such that is satisfies the relation $I_{dp}-\Delta I_d-I_d=0$. Since the converter operating as the forward converter or rectifier is placed under constant-current control, the relation $I_{dp}=I_d$ holds, and $-\Delta I_d$ acts to saturate the operational amplifier in the constant-current control circuit 1 in the control unit C associated with the inverter. In this case, the value of $E_{1i}$ is maximum, and $\beta = 0°$. The output $E_2$ ($E_{2i}$) of the circuit 2 in the control unit C associated with the inverter is such that it satisfies the relation $V_{dp}-V_d=0$ and thus lies within the inverter region. The output $E_3$ ($E_{3i}$) of the circuit 3 in the control unit C associated with the inverter is intended to prevent commutation failure as described above, and its voltage value lies naturally within the inverter region. Generally, this $E_{3i}$ is selected to satisfy the relation $E_{2i} < E_{3i}$. Consequently, the signal $E_2$ is selected as a minimum voltage signal by the signal selection circuit 5 in the control unit C associated with the inverter, so that the DC terminal voltage $V_{di}$ of the inverter is controlled to be constant. In the manner above described, the forward converter is placed under constant-current control, while the reverse converter is placed under constant-voltage control so that the constant power specified at the operation command unit D can be transmitted over the DC power transmission system.

Before describing the function of the voltage limit indication circuit 4 in each control unit C, description will be given as to what kind of relation is required between the control angle $\alpha$ or $\beta$ and the DC current $I_d$ as well as the AC terminal voltage $e_2$ for maintaining constant the loss $(R \cdot I_d^2 + \frac{1}{2} C e_2^2)$ of the damping circuit in each thyristor valve.

Figure 3B:
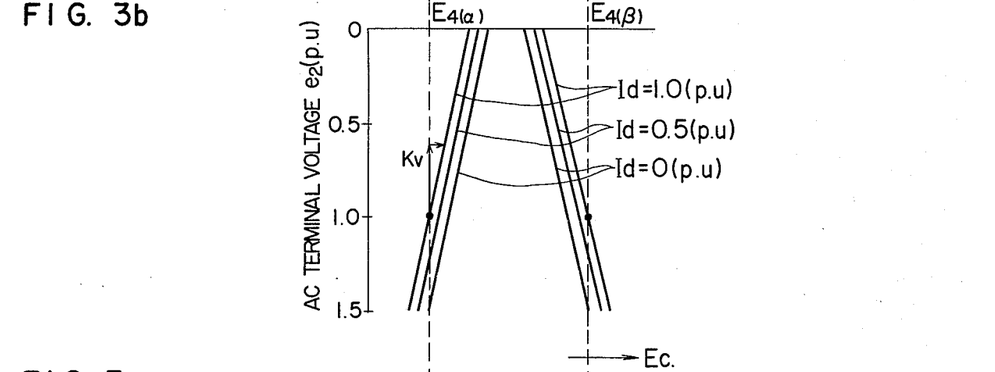
FIG. 3b shows the relation between the control voltage $E_c$ and the AC terminal voltage $e_2$ for maintaining constant the thyristor damping circuit loss when the DC current $I_d$ is constant.
Figure 3C:
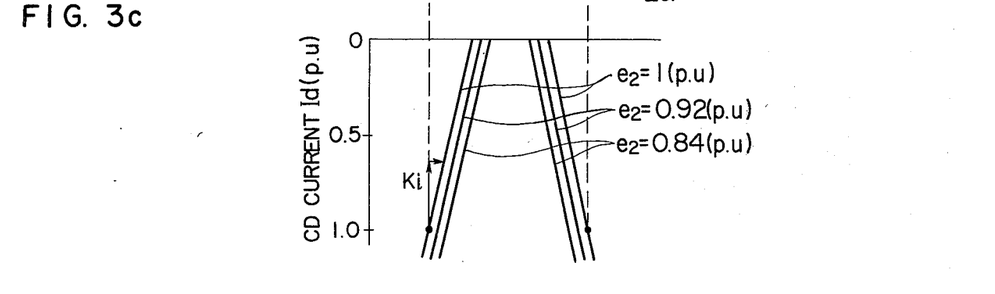
FIG. 3c shows the relation between the control voltage $E_c$ and the DC current $I_d$ for maintaining constant the thyristor damping circuit loss when the AC terminal voltage $e_2$ is constant.

FIG. 3b shows the relation between the control voltage $E_c$ and the AC terminal voltage $e_2$ required for maintaining the damping loss constant, in which the DC current $I_d$ is used as a parameter. As described already with reference to FIG. 3a, the control voltage $E_c$ is proportional to the control angles $\alpha$ and $\beta$. In FIG. 3b, the AC terminal voltage $e_2$ and the DC current $I_d$ are expressed in terms of percent units (p·u) relative to their rated values. The damping loss is deemed maximum when $e_2 = 1.0$ (p·u), $I_d = 1.0$ (p·u), and the control angle $\alpha = \beta = 40°$. In the present invention, the damping loss is limited to less than the maximum above described. FIG. 3c shows the relation between $I_d$ and $E_c$ under the same condition, and $e_2$ is used as a parameter. In FIGS. 3b and 3c, the right-hand three characteristic curves represent the limit when the converter operates as an inverter, and the left-hand three characteristic curves represent the limit when the converter operates as a rectifier. It can be understood from FIGS. 3b and 3c that $E_c$ is approximately proportional to $e_2$ when $I_d$ is fixed, and the smaller the value of $e_2$, the control angle $\alpha$ or $\beta$ can be made larger. Also, $E_c$ is approximately proportional to $I_d$ when $e_2$ is fixed, and the smaller the value of $I_d$, the control angle $\alpha$ or $\beta$ can be made larger. Thus, the reactive power can be controlled without increasing the damping loss when the control angles are set at the values determined by these characteristic curves.

Figure 2:
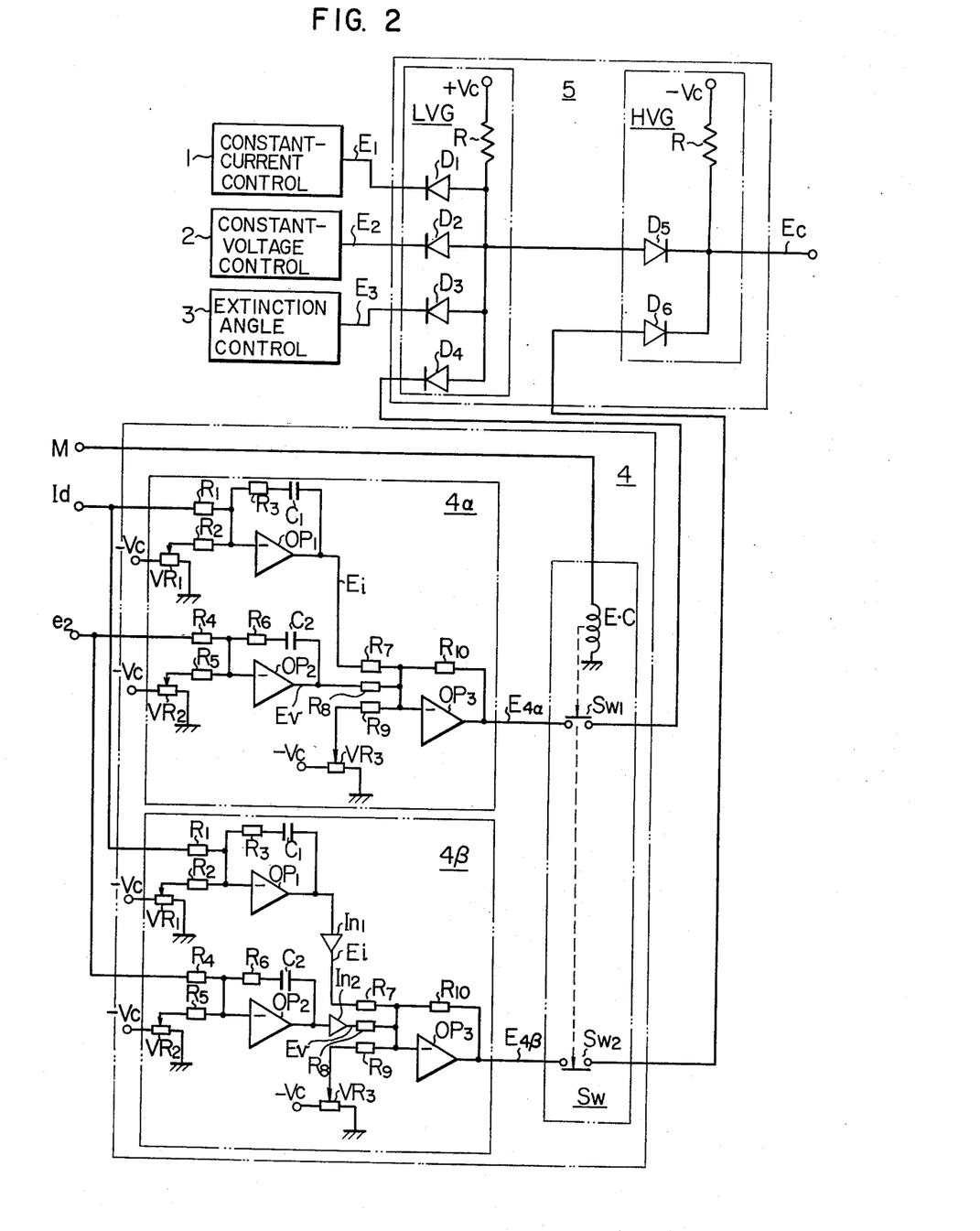
FIG. 2 is a circuit diagram showing in detail the structure of one form of the limiter and one form of the signal selection circuit constituting the principal parts of each converter control unit according to the present invention.

One form of the structure of the voltage limit indication circuit 4 is shown in detail in FIG. 2. This circuit 4 generates output signals representing the control angles $\alpha$ and $\beta$ determined by the characteristic curves shown in FIGS. 3b and 3c. Since each converter operates as an inverter or a rectifier depending on the direction of the power transmission, this circuit 4 comprises a first circuit $4\beta$ generating a first limit signal $E_{4\beta}$ representing the limit of the advance angle $\beta$ and a second circuit $4\alpha$ generating a second limit signal $E_{4\alpha}$ representing the limit of the delay angle $\alpha$. These circuits $4\alpha$ and $4\beta$ include resistors R, capacitors C, operational amplifiers OP of negative output type, variable resistors $V_R$ and sources of a reference voltage $V_c$. The capacitor C disposed in the feedback path of each operational amplifier OP acts to eliminate noise from the detected values of $I_d$ and $e_2$. The operational amplifiers $OP_1$ and $OP_2$ have such an arithmetic function that each operates normally as a proportional circuit.

The operational amplifier $OP_1$ in each of the circuit $4\alpha$ and $4\beta$ provides an output signal $E_i = -k_i(I_d - I_{do})$ which is proportional to the difference between the detected DC current $I_d$ and a reference DC current $I_{do}$. The coefficient $k_i$ is determined by the ratio $(R_3/R_1) = (R_3/R_2)$ and thus represents the gradient of the characteristic curves shown in FIG. 3c, and the reference current $I_{do}$ is obtained by dividing $-V_c$ by the variable resistor $V_{R1}$. This output signal $E_i$ represents the variation in the control angle when $I_d$ varies while $e_2$ is fixed. As is well known, the control advance angle $\beta$ is the factor which controls the operation of the inverter from the theoretical viewpoint. However, in the practical circuit operation, the control delay angle $\alpha$ is the factor used for determining the firing phase of the inverter. Therefore, in the circuit $4\beta$ providing the limit signal $E_{4\beta}$ during the operation of the converter as the inverter, the output signal $E_i$ of the operational amplifier $OP_1$ is inverted by a polarity inverter $I_{n1}$, and this inverted signal provides the signal $E_i$. That is, the signal $E_i$ in the circuit $4\beta$ is given by $E_i = -k_i(I_{do} - I_d)$.

The operational amplifier $OP_2$ in each of the circuits $4\alpha$ and $4\beta$ provides an output signal $E_v = -k_v(e_2 - e_{20})$ which is proportional to the difference between the detected AC terminal voltage $e_2$ and a reference AC voltage $e_{20}$. The coefficient $k_v$ is determined by the ratio $(R_6/R_4) = (R_6R_5)$ and thus represents the gradient of the characteristic curves shown in FIG. 3b, and this reference voltage $e_{20}$ is obtained by dividing $-V_c$ by the variable resistor $V_{R2}$. This output signal $E_v$ represents the variation in the control angle when $e_2$ varies while $I_d$ is fixed. In the circuit $4\beta$, the output signal $E_v$ of the operational amplifier $OP_2$ is inverted by a polarity inverter $I_{n2}$, and this inverted signal provides the signal $E_v$ which is therefore given by $E_v = -k_v(e_{20} - e_2)$. In each of the circuits $4\alpha$ and $4\beta$, the signals $E_i$ and $E_v$ thus obtained are summed to find the total variation in the control angle. The operational amplifier $OP_3$ in each of the circuits $4\alpha$ and $4\beta$ finds the sum of the signals $E_i$, $E_v$ and a bias voltage $E_{40}$, so that the voltage limit signals $E_{4\alpha}$ and $E_{4\beta}$ satisfying the characteristics shown in FIGS. 3b and 3c appear from the circuit 4. The bias voltage $E_{40}$ is obtained by dividing $-V_c$ by the variable resistor $V_{R3}$. This bias voltage $E_{40}$ in the circuit $4\alpha$ corresponds to the control voltage $E_c$ appearing when the control angle $\alpha = 40°$, while that in the circuit $4\beta$ conrresponds to the control voltage $E_c$ appearing when the control angle $\beta = 40°$. Thus, finally, the voltage limit signals $E_{4\alpha}$ and $E_{4\beta}$ are given by the following equations (4) and (5) respectively:

$$E_{4\alpha} = E_{40(\alpha)} - k_i(I_{do} - I_d) - k_v(e_{20} - e_2) \quad (4)$$

$$E_{4\beta} = E_{40(\beta)} + k_i(I_{do} - I_d) + k_v(e_{20} - e_2) \quad (5)$$

The voltage limit indication circuit 4 includes a pair of change-over switches $S_{w1}$ and $S_{w2}$ in a switching circuit $S_w$. When the operation mode signal M applied from the operation command unit D instructs that the associated converter operates as a rectifier, an exciting coil EC in the switching circuit $S_w$ is energized to close the switch $S_{w1}$ and to open the switch $S_{w2}$ so that the output signal $E_{4\alpha}$ appears from the circuit 4. On the other hand, when the inverter operation mode is instructed, the coil EC is deenergized to open the switch $S_{w1}$ and to close the switch $S_{w2}$ so that the output signal $E_{4\beta}$ appears from the circuit 4.

One form of the structure of the signal selection circuit 5 will be described with reference also to FIG. 2. This signal selection circuit 5 comprises a low value gate circuit LVG to which the signals $E_1$, $E_2$, $E_3$ and $E_{4\alpha}$ are applied as its inputs, and a high value gate circuit HVG to which the signal $E_{4\beta}$ and the output signal of the circuit LVG are applied as its inputs. The circuit LVG includes a resistor R and diodes $D_1$ to $D_4$, and the circuit HVG includes a resistor R and diodes $D_5$, $D_6$. The operation and structure of these circuits LVG and HVG are well known in the art, and any detailed description is therefore unnecessary.

When the associated converter operates as a forward converter or rectifier, the signal selection circuit 5 selects a minimum control voltage signal, and generally, the signal $E_1$ is selected to appear as the signal of the circuit LVG. In response to the application of this output signal $E_1$ to the circuit HVG, the output signal $E_c = E_1$ appears therefrom since the signal $E_{4\beta}$ applied to the circuit HVG from the circuit 4 is $E_{4\beta} = 0$. On the other hand, the signal $E_{4\alpha}$ is selected when this signal $E_{4\alpha}$ is proved to be a minimum voltage signal depending on the requirement for the reactive power control or other controls, thereby limiting the control delay angle $\alpha$ so as not to increase the dampling loss of the thyristor valves over the predetermined limit. The signal $E_2$ or $E_3$ is generally selected as the output of the circuit LVG when the associated converter operates as an inverter. In this case, the signal $E_{4\alpha}$ is blocked or inhibited by the open switch $S_{w1}$, and also, its potential level is raised by means (not shown) over those of the signals $E_1$, $E_2$ and $E_3$ so that it may not be selected as the output of the circuit LVG. The ouput signal of the circuit LVG is generally selected by the circuit HVG, and when the level of the signal $E_{4\beta}$ becomes higher than that of the output of the circuit LVG depending on the requirement for the reactive power control or other controls, the signal $E_{4a}$ is selected to limit the control advance angle $\beta$.

The apparatus according to the present invention is generally constructed as described hereinbefore, and the manner of controlling the reactive power by the apparatus of the present invention is basically classified into a converter control-angle control method and a tapped transformer control method. These methods will now be described in detail.

Converter control-angle control method

It will be seen from the aforementioned equations (1) to (3) that the reactive power Q is expressed as a function of the control delay angle $\alpha$ and control advance angle $\beta$, and on the basis of the above fact, the reactive power Q is controlled by suitably varying the control angle $\alpha$ or $\beta$.

It will be apparent from FIG. 2 that the voltage limit indication circuit 4 cooperates with the high value gate circuit HVG or the low value gate circuit LVG to function as a limiter so that the loss of the damping circuits in the thyristor valves can be limited to less than a predetermined limit. Making the control angle $\alpha$ or $\beta$ variable can be realized by detecting the reactive power Q and applying a signal $E_Q$ related to the reactive power Q to either of the circuits 1, 2 and 3 generating the voltage signals $E_1$, $E_2$ and $E_3$ respectively. This signal $E_Q$ may be applied in the form of a bias voltage to, for example, the circuit 1 generating the signal $E_1$, or this signal $E_Q$ may be directly applied as an input to one of the control circuits 1, 2 and 3. There may be various ways for achieving the above manner of varying the control angle $\alpha$ or $\beta$, and the present invention does not in any way specify the way with which the signal $E_Q$ is applied. It is better, however, that this reactive power signal $E_Q$ be applied to the constant-current control circuit 1 in the control unit C associated with the forward converter or rectifier as described with reference to FIG. 3a. This is because the attainment of the above purpose with the constant-voltage circuit 2 requires troublesome procedures as it is necessary to increase the value of $E_1$ up to a sufficiently large value after decreasing the value of $E_2$ until it lies within the forward converter region. For similar reasons, it is better to apply the reactive power signal $E_Q$ to the constant-voltage control circuit 2 in the control unit C associated with the reverse converter or inverter.

Preferred forms of a circuit arrangement suitable for such a manner of reactive power control will be described with reference to FIGS. 4a and 4b.

Figure 4A:
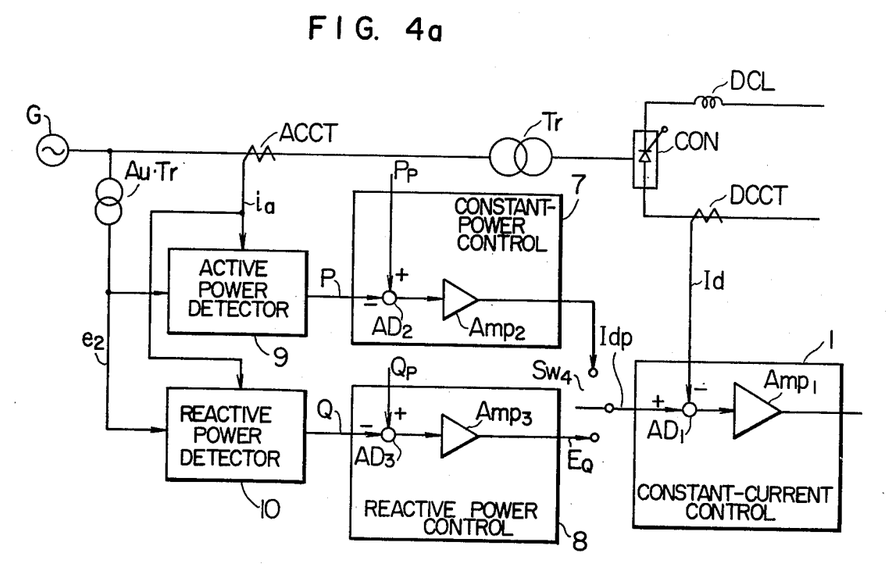
FIG. 4a shows an arrangement in which a reactive power signal is applied to the constant-current control circuit in the control unit.

FIG. 4a shows a circuit arrangement for applying such a signal $E_Q$ to the constant-current control circuit 1 in the control unit C associated with the forward converter. Referring to FIG. 4a, the constant-current control circuit 1 comprises an adder $AD_1$ finding the error $(I_{dp}-I_d)$ between the DC current setting signal $I_{dp}$ and the detected current signal $I_d$, and an amplifier $A_{mp1}$ amplifying the output signal of the adder $AD_1$. The current setting $I_{dp}$ appears continuously as the output signal of a constant-power control circuit 7 to be applied to the circuit 1 through a switch $S_{w4}$. The constant-power control circuit 7 comprises an adder $AD_2$ finding the error $(P_p-P)$ between the output signal P of an active power detector 9 and an active power setting signal $P_p$, and an amplifier $A_{mp2}$ amplifying the output signal of the adder $AD_2$. The combination of these circuits 9, 7 and 1 controls the current for maintaining constant the converted power. A reactive power detector 10 detects the reactive power Q, and a reactive power control circuit 8 generates an output signal $E_Q$ related to or indicative of the reactive power Q to apply this signal $E_Q$ to the circuit 1 in lieu of the current setting signal $I_{dp}$. The reactive power control circuit 8 comprises an adder $AD_3$ finding the error $(Q_p-Q)$ between the actual detected reactive power value Q and a setting $Q_p$, and an amplifier $A_{mp3}$ amplifying the output signal of the adder $AD_3$. An AC current transformer ACCT applies its output current value $i_a$ to the detectors 9 and 10. Thus, the reactive power Q can be controlled to be constant by changing over the switch $S_{w4}$. The circuits 7 and 8 may be disposed in the operation command unit D or may be provided adjacent to each converter. In this latter case, the setting signals $P_p$ and $Q_p$ are transmitted from the operation command unit D.

Figure 4B:
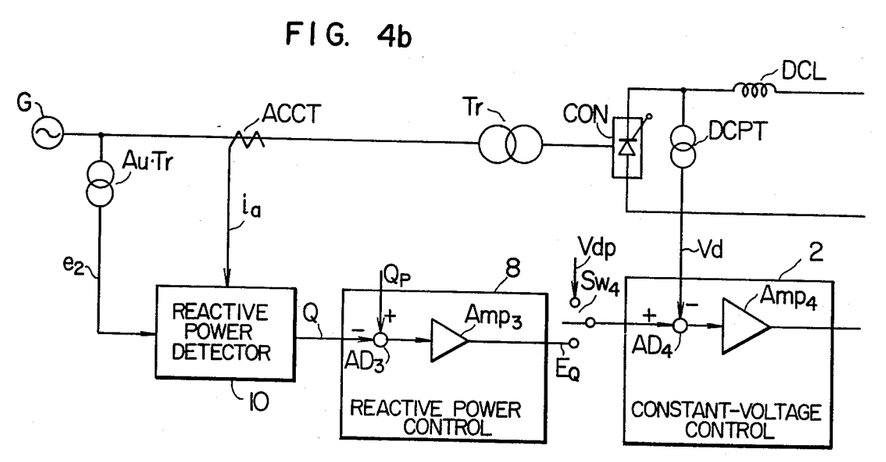
FIG. 4b shows an arrangement in which the reactive power signal is applied to the constant-voltage control circuit in the control unit.

FIG. 4b shows a circuit arrangement for applying such a signal $E_Q$ to the constant-voltage control circuit 2 in the control unit C when the converter operates as the reverse converter. Referring to FIG. 4b, the switch $S_{w4}$ is changed over for the purpose of the reactive power control, so that the output signal $E_Q$ of the reactive power control circuit 8 is applied to the circuit 2 in lieu of the voltage setting signal $V_{dp}$. Besides the circuit arrangements above described, there is a circuit arrangement in which the reactive power control circuit 8 is connected in parallel with the circuits 1, 2 and 3 for applying its output signal $E_Q$ to the low value gate circuit LVG. However, this circuit arrangement is not so expedient in that an additional means is required for the change-over between the control circuit 8 and the other control circuits used normally for the power conversion control. Further, a signal for maintaining a constant power factor may be used to control the control angle $\alpha$ or $\beta$.

Tapped transformer control method

It can be seen from the equations (1) to (3) that the reactive power Q can be controlled by varying the AC terminal voltage $e_2$. Further, it will be seen from FIG. 3c that the lower the voltage $e_2$, the larger is the maximum allowable control angle for maintaining constant the damping loss of the thyristor valves. On the basis of the above facts, the tap position of the tapped transformer Tr is also taken into account for the reactive power control.

A few typical examples of this method will now be described.

Figure 5:
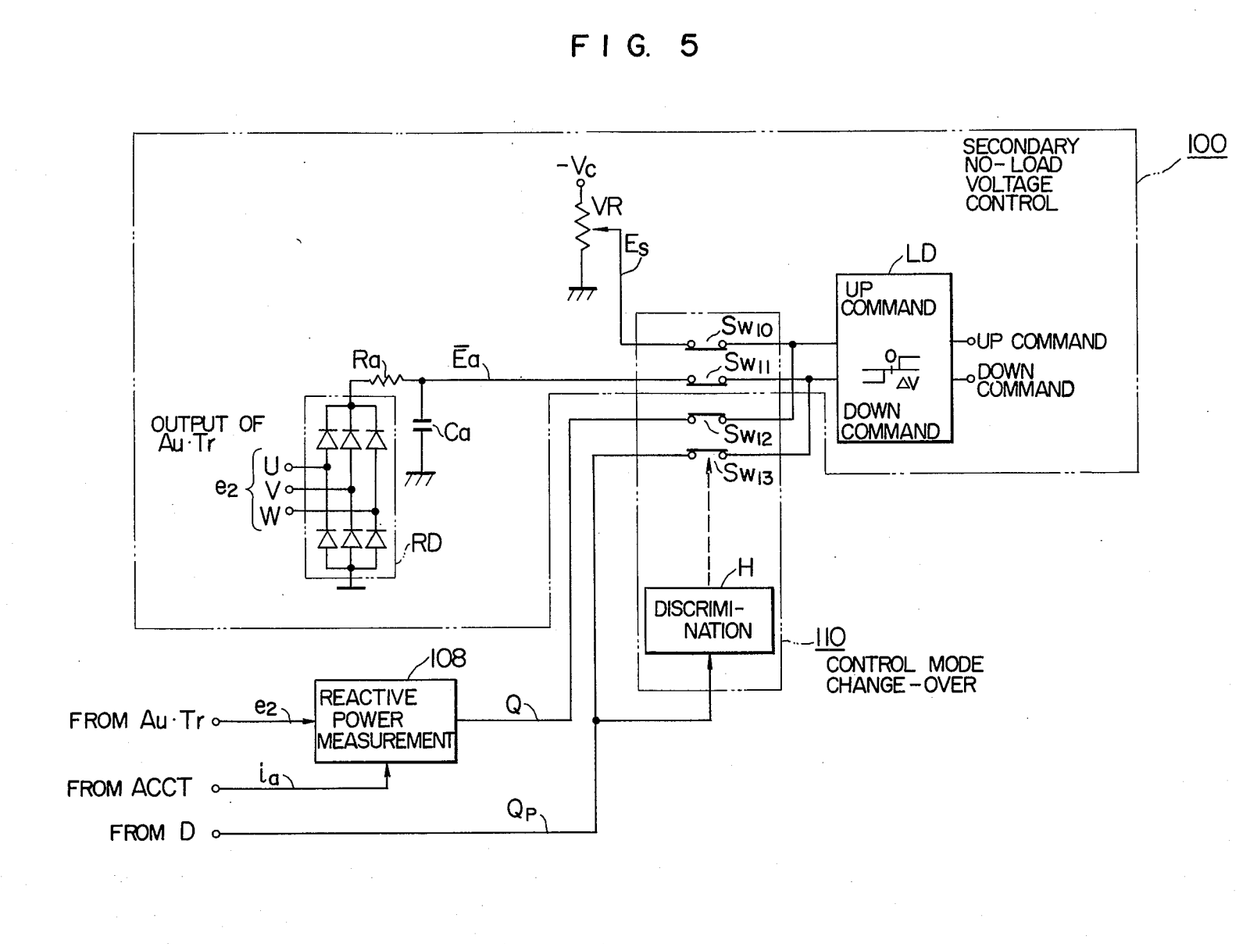
FIG. 5 shows another arrangement in which the reactive power signal is applied to a transformer secondary voltage control circuit to change the tap position of the tapped transformer for the control of the reactive power.

FIG. 5 shows a first arrangement in which, on the basis of the relation given by the equations (1) to (3), the tap position of the tapped transformer Tr is changed in response to a reactive power signal $E_Q$. Referring to FIG. 5, the reference numeral 100 designates a well-known circuit for maintaining constant the no-load voltage at the converter side or secondary side of the transformer Tr. According to the present invention, a control mode change-over unit 110 and a reactive power measuring circuit 108 are additionally provided.

The function of the circuit 100 will be described at first. During the stage of commutation by the converter, the secondary winding of the transformer Tr is short-circuited to provide zero voltage thereacross, and the no-load voltage at the secondary side terminal of the transformer Tr cannot be measured. However, as shown in FIG. 1, the auxiliary transformer Au·Tr is also of the tapped structure with its tap position adapted to be changed in interlocking relation with that of the transformer Tr so as to permit measurement of this no-load voltage. This measured secondary voltage $e_2$ is rectified by a rectifier $R_D$ and is then filtered by the combination of a resistor Ra and a capacitor Ca to appear as a signal $\overline{Ea}$ indicative of the amount of DC current. On the other hand, a reference no-load secondary voltage Es is obtained by dividing the reference voltage $-Vc$ by a variable resistor or voltage divider $V_R$. These signals Es and $\overline{Ea}$ are compared in a level comparator LD, and a tap-position up command signal appears from the level comparator LD when $Es > \overline{Ea}$, thereby changing the tap positions of the transformers Tr and Au·Tr. Consequently, the tap position in each transformer continues to change in the up direction until a balance is reached between Es and $\overline{Ea}$ with the increase in $\overline{Ea}$. The tap control is such that the tap-position command signal does not appear until the error between Es and $\overline{Ea}$ exceeds a predetermined value. A tap-position down command signal appears from the level comparator LD when $Es < \overline{Ea}$.

The reactive power control according to the present invention is thus simply realized by adding the reactive power measuring circuit 108 and the control mode change-over unit 110 to the no-load voltage control circuit 100. The reactive power measuring circuit 108 shown in FIG. 5 is similar to the circuit 8 described with reference to FIG. 4 and finds the reactive power Q on the basis of the detected AC voltage $e_2$ and detected AC current $i_a$. The signal representing the reactive power Q and the reference of target signal $Q_p$ from the operation command unit D are applied to the level comparator LD through change-over switches $S_{w12}$ and $S_{w13}$ respectively in the control mode change-over unit 110 which comprises a plurality of such change-over switches $S_{w10}$ to $S_{w13}$ and a discrimination circuit H. When, for example, the target signal $Q_p$ is null during the normal no-load secondary voltage control and has a suitable level during the reactive power control, the switches $S_{w10}$ and $S_{w11}$ are closed and the switches $S_{w12}$ and $S_{w13}$ are opened in the former case, while the switches $S_{w10}$ and $S_{w11}$ are opened and the switches $S_{w12}$ and $S_{w13}$ are closed in the latter case. In this latter case or during the reactive power control, the level comparator LD generates a tap-position down command signal when $Q_p > Q$ thereby decreasing $e_2$ to increase Q and generates a tap-position up command signal when $Q_p < Q$ thereby increasing $e_2$ to decrease Q.

In this first arrangement, the voltage limit indication circuit 4 in FIG. 2 functions as a limiter so that, during the tap-position changing transient state or the steady operating state, the control angle $\alpha$ or $\beta$ may not exceed the predetermined limit. In this case, the converters may be placed under constant-current control and constant-voltage control respectively, or the control angle $\alpha$ or $\beta$ may be fixed by the output signal $E_4$ of the voltage limit indication circuit 4.

Figure 6:
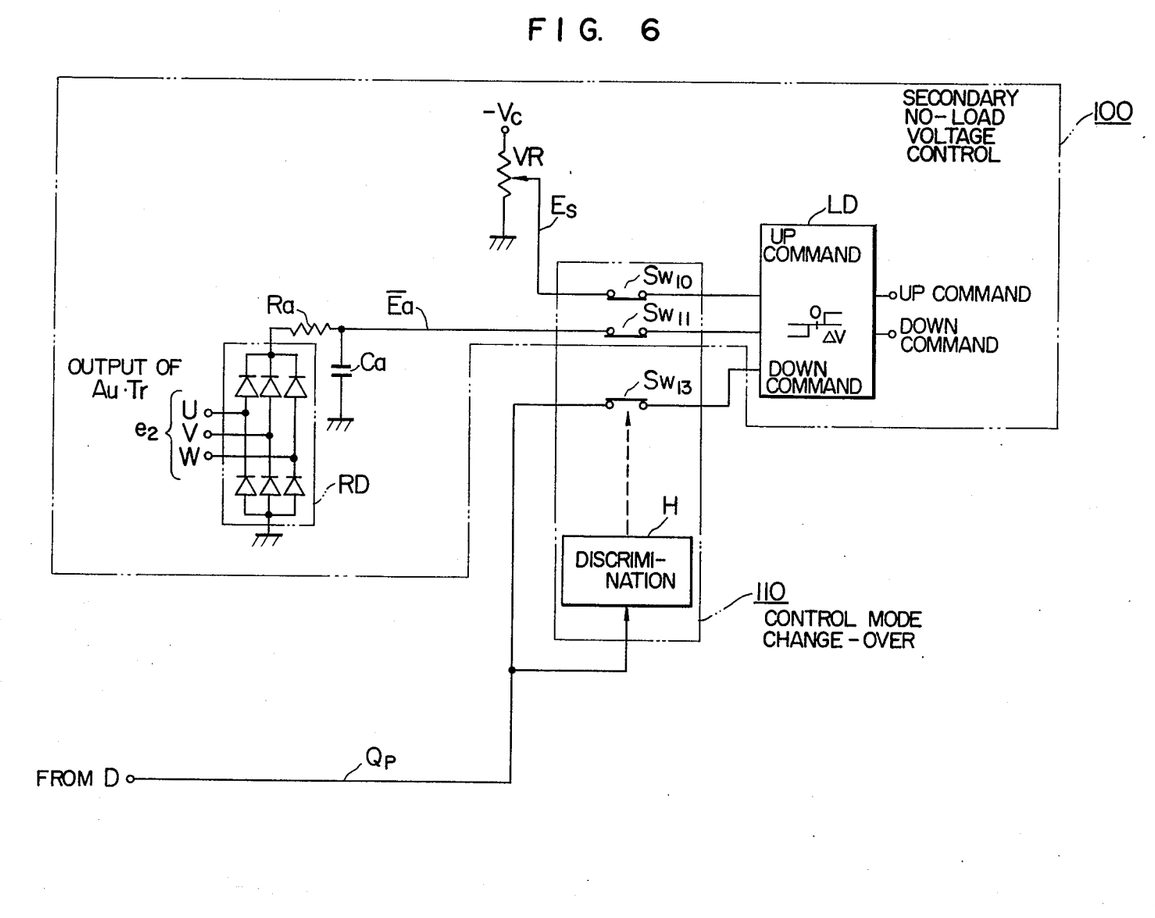
FIG. 6 shows a modification of the arrangement shown in FIG. 5, in which the tap position of the tapped transformer is controlled to make the reactive power variable within the widest possible range.

FIG. 6 shows a second arrangement or a modification of the first arrangement shown in FIG. 5. In this second arrangement, the variable range of the reactive power Q is windened by the tap position control. When the signal $Q_p$ applied from the operation command unit D instructs the reactive power control, the discrimination circuit H acts to open the switches $S_{w10}$ and $S_{w11}$ thereby stopping the no-load secondary voltage control and acts to close the switch $S_{w13}$ thereby applying the signal $Q_p$ to the level comparator LD. In response to the application of the signal $Q_p$, the level comparator LD generates a tap-position down signal to provide the lowermost tap position. It will be seen from FIG. 3c that the voltage $e_2$ at the converter-side terminal of the transformer Tr is lowest in the lowermost tap position, and the voltage limit provided by the signal $E_4$ for maintaining the constant thyristor valve loss has a maximum level in the control unit C associated with the rectifier and has a minimum level in the control unit C associated with the inverter. Therefore, the variable range of the control angles $\alpha$ and $\beta$ can be windened when the reactive power Q is controlled by the converters in a manner as shown in FIG. 4. According to the equation (1), a decrease in the AC terminal voltage $e_2$ results in a decrease of the reactive power Q by an amount $Q(e_2)$. However, due to the fact that the variable range of the control angles $\alpha$ and $\beta$ is windened due to the decrease in the voltage $e_2$, the increment $Q(\phi)$ of the reactive power Q due to the control angle increment (for example, the difference between the maximum allowable control angle at the lowermost tap position and the maximum allowable control angle at the rated tap position) is greater than $Q(e_2)$, and the reactive power Q is rather increased to widen the variable range of the reactive power Q.

Another embodiment of the present invention will next be described in which the reactive power alone is controlled while maintaining the active power constant.

In this embodiment, the converter operating as a forward converter or rectifier is placed under constant-current control, in a manner as shown in FIG. 4a, and the current setting signal $I_{dp}$ is derived from the output of the constant-power control circuit 7. On the other hand, the converter operating as a reverse converter or inverter is placed under constant-voltage control, in a manner as shown in FIG. 4b, and the reactive power signal $E_Q$ appearing from the reactive power control circuit 8 is used to control the reference or target signal $V_{dp}$ applied to the constant-voltage control circuit 2 for the reactive power control. According to this method, the signal $V_{dp}$ applied to the circuit 2 in the control unit C associated with the inverter is varied to cause a corresponding variation of the control angle $\beta$ thereby varying the reactive power Q given by the equation (1). Since, in this case, the DC thermal voltage of the inverter also varies, the reactive power Q will not be transiently maintained constant. However, due to the fact that the current setting $I_{dp}$ is varied by the action of the constant-power control circuit 7 in the control unit C associated with the forward converter, the active power (Vd·Id) derived from the inverter can be maintained substantially constant. Further, as described hereinbefore, the additional application of the tap control during varying the voltage setting $V_{dp}$ can widen the adjustable range of the reactive power.

Figure 7:
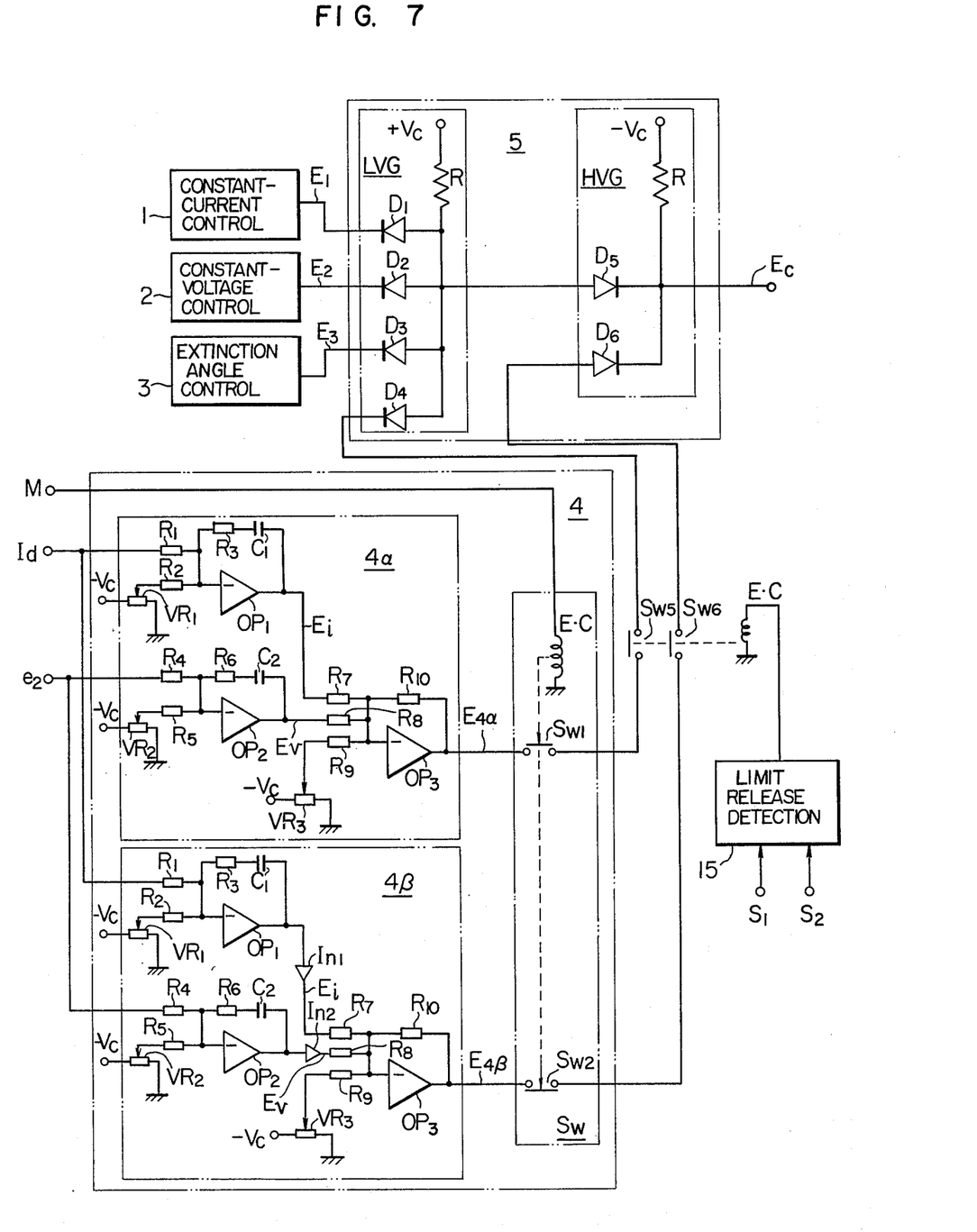
FIG. 7 is a circuit diagram of a modification of the embodiment shown in FIG. 2, in which an additional means is provided for ensuring a harmony between the voltage limit indication circuit and the start-stop circuit or the protective circuit.

It will be understood from the foregoing detailed description that the voltage limit indication circuit 4 in the apparatus according to the present invention functions to prevent the damping loss of the thyristor valves from an undesirable increase beyond the predetermined limit regardless of whatever manner of the reactive power control. Therefore, the apparatus according to the present invention contributes greatly to the improvement in the conversion efficiency of the converters during the reactive power control and other controls in the steady-state operation of the DC power transmission system. However, due to the fact that this circuit 4 is basically a limiter, it may obstruct the system operation during the start-stop stage or in the event of system failure. In the start-stop stage, for example, the starting stage, the so-called soft starting is generally carried out in which the control angles $\alpha$ and $\beta$ are generally gradually shifted toward their individual regions from $\alpha=\beta=90°$. However, the control angles $\alpha$ and $\beta$ are not permitted to exceed their limits in that stage due to the presence of the circuit 4. Further, in the event of system failure, it is a common practice that a step of gate shift for shifting the control angles $\alpha$ and $\beta$ to 90° is followed by a step of a gate block for blocking application of the firing pulses to the converters. However, this protective operation is made impossible due to the presence of the circuit 4. No trouble whatsoever arises when the gate shift signal can be applied to the circuits succeeding the signal selection circuit 5 in each control unit C shown in FIG. 1. When, however, the gate shift signal is applied to the signal selection circuit 5, an additional means as shown in FIG. 7 is required to prevent the above trouble. Referring to FIG. 7, a limit release detection unit 15 is additionally provided to detect a start-stop signal $S_1$ or a failure detection signal $S_2$. When the unit 1t detects application of any one of these signals $S_1$ and $S_2$, it energizes an exciting coil E·C thereby opening switches $S_{w5}$ and $S_{w6}$. Therefore, the obstruction provided by the presence of the voltage limit indicated circuit 4 during the start-stop stage or in the event of system failure can be completely eliminated.

It will be appreciated from the foregoing detailed description that the apparatus according to the present invention can limit the damping loss of the thyristor valves to less than a maximum allowable limit thereby improving the conversion efficiency of the converters. It will be appreciated further that the variable range of the reactive power can be widened as much as possible while limiting the damping loss of the thyristor valves to less than the above limit. It will be appreciated further that a harmony can be provided between the reactive power control function and the other functions including the protection and start-stop functions.

What we claim is:

1. A DC power transmission control apparatus comprising a DC power transmission system connecting by way of a power transmission line between a DC terminal of a first thyristor converter operating as a forward converter and a DC terminal of a second thyristor converter operating as a reverse converter, an AC system connected to an AC terminal of each said thyristor converter through a transformer, and a converter control unit provided for each said thyristor converter and comprising a plurality of control circuits, a signal selection circuit selecting one of the output signals of said control circuits, and a phase shift circuit firing said thyristor converter with the phase determined by the output signal of said signal selection circuit, wherein each said converter control unit further comprises an output limit indication circuit generating an output signal indicative of a control advance angle or a control delay angle required for maintaining constant the damper loss of said thyristor converter and applying this output signal as an additional input to said signal selection circuit, and said signal selection circuit selects such as output signal that the control advance angle or the control delay angle for said thyristor converter indicated by the signal selected by said signal selection circuit is smaller than the control angle indicated by the output signal of said output limit indication circuit.

2. A DC power transmission control apparatus as claimed in claim 1, wherein each said converter control unit comprises at least a constant-current control circuit and a constant-voltage control circuit, and the output signal of said constant-current control circuit is selected by said signal selection circuit in said converter control unit associated with said forward converter, while the output signal of said constant-voltage control circuit is selected by said signal selection circuit in said converter control unit associated with said reverse converter, the control advance angle or the control delay angle indicated by the signal selected by said signal selection circuit in each said converter control unit being limited so as not to be larger than the control angle indicated by the output signal of said output limit indication circuit.

3. A DC power transmission control apparatus as claimed in claim 2, wherein each said converter control unit further comprises a reactive power control circuit so that the output signal of said reactive power control circuit is selected by said signal selection circuit when the reactive power is to be controlled by said thyristor converter, and the control advance angle or the control delay angle indicated by the signal selected by said signal selection circuit is limited so as not to be larger than the control angle indicated by the output signal of said output limit indication circuit.

4. A DC power transmission control apparatus as claimed in claim 2, wherein a reactive power signal is applied to one of said control circuits in each said converter control unit so that the output signal of said control circuit is selected by said signal selection circuit when the reactive power is to be controlled by said thyristor converter, and the control advance angle or the control delay angle indicated by the signal selected by said signal selection circuit is limited so as not to be larger than the control angle indicated by the output signal of said output limit indication circuit.

5. A DC power transmission control apparatus as claimed in claim 1, wherein said output limit indication circuit in each said converter control unit receives the converter-side terminal voltage of said transformer as at least one input thereto, and its output signal varies in such a direction as to increase the control angle limit for said thyristor converter with a decrease in said terminal voltage.

6. A DC power transmission control apparatus as claimed in claim 2, wherein said output limit indication circuit in each said converter control unit receives the converter-side terminal voltage of said transformer as at least one input thereto, and its output signal varies in such a direction as to increase the control angle limit for said thyristor converter with a decrease in said terminal voltage.

7. A DC power transmission control apparatus as claimed in claim 3, wherein said output limit indication circuit in each said converter control unit receives the converter-side terminal voltage of said transformer as at least one input thereto, and its output signal varies in such a direction as to increase the control angle limit for said thyristor converter with a decrease in said terminal voltage.

8. A DC power transmission control apparatus as claimed in claim 4, wherein said output limit indication circuit in each said converter control unit receives the converter-side terminal voltage of said transformer as at least one input thereto, and its output signal varies in such a direction as to increase the control angle limit for said thyristor converter with a decrease in said terminal voltage.

9. A DC power transmission control apparatus as claimed in claim 1, wherein said output limit indication circuit in each said converter control unit receives the converter-side terminal voltage of said transformer and the DC current in said transmission system as its inputs, and its output signal varies in such a direction as to increase the control angle limit for said thyristor converter with a decrease in said terminal voltage and also with a decrease in said current.

10. A DC power transmission control apparatus as claimed in claim 2, wherein said output limit indication circuit in each said converter control unit receives the converter-side terminal voltage of said transformer and the DC current in said transmission system as its inputs, and its output signal varies in such a direction as to increase the control angle limit for said thyristor converter with a decrease in said terminal voltage and also with a decrease in said current.

11. A DC power transmission control apparatus as claimed in claim 3, wherein said output limit indication circuit in each said converter control unit receives the converter-side terminal voltage of said transformer and the DC current in said transmission system as its inputs, and its output signal varies in such a direction as to increase the control angle limit for said thyristor converter with a decrease in said terminal voltage and also with a decrease in said current.

12. A DC power transmission control apparatus as claimed in claim 4, wherein said output limit indication circuit in each said converter control unit receives the converter-side terminal voltage of said transformer and the DC current in said transmission system as its inputs, and its output signal varies in such a direction as to increase the control angle limit for said thyristor converter with a decrease in said terminal voltage and also with a decrease in said current.

13. A DC power transmission control apparatus comprising a DC power transmission system connecting by way of a power transmission line between a DC terminal of a first thyristor converter operating as a forward converter and a DC terminal of a second thyristor converter operating as a reverse converter, an AC system connected to an AC terminal of each said thyristor converter through a transformer, and a converter control unit provided for each said thyristor converter and comprising a plurality of control circuits, a signal selection circuit selecting one of the output signals of said control circuits, and a phase shift circuit firing said thyristor converter with the phase determined by the output signal of said signal selection circuit, wherein each said converter control unit further comprises an output limit indication circuit receiving the converter-side terminal voltage of said transformer and the DC current in said transmission system as its inputs and generating an output signal which varies in such a direction as to increase the control angle limit for said thyristor converter with a decrease in said terminal voltage and also with a decrease in said current, and said signal selection circuit receives the output signal of said output limit indication circuit together with the output signals of said control circuits controlling the operation of said thyristor converter as its inputs and selects such an output signal that the control advance angle or the control delay angle for said thyristor converter indicated by the signal selected by said signal selection circuit is smaller than the control angle indicated by the output signal of said output limit indication circuit.

14. A DC power transmission control apparatus comprising a DC power transmission system connecting by way of a power transmission line between a DC terminal of a first thyristor converter operating as a forward converter and a DC terminal of a second thyristor converter operating as a reverse converter, an AC system connected to an AC terminal of each said thyristor converter through a transformer, and a converter control unit provided for each said thyristor converter and comprising a plurality of control circuits, a signal selection circuit selecting one of the output signals of said control circuits, and a phase shift circuit firing said thyristor converter with the phase determined by the output signal of said signal selection circuit, wherein each said converter control unit further comprises an output limit indication circuit generating an output signal indicative of a control advance angle or a control delay angle required for maintaining constant the damper loss of said thyristor converter and applying this output signal as an additional input to said signal selection circuit, said signal selection circuit selecting such an output signal that the control advance angle or the control delay angle for said thyristor converter indicated by the signal selected by said signal selection circuit is smaller than the control angle indicated by the output signal of said output limit indication circuit, each said transformer being of the tapped construction, and a tap control unit is provided for each said tapped transformer for changing the tap position of said transformer in response to a reactive power signal when the reactive power is to be controlled by said thyristor converter.

15. A DC power transmission control system as claimed in claim 14, wherein each said tap control unit controls the tap position of said transformer so as to normally maintain constant the no-load voltage at the converter-side terminal of said transformer.

16. A DC power transmission control apparatus as claimed in claim 14, wherein said output limit indication circuit in each said converter control unit receives the converter-side terminal voltage of said transformer as at least one input thereto, and its output signal varies in such a direction as to increase the control angle limit for said thyristor converter with a decrease in said terminal voltage.

17. A DC power transmission control apparatus as claimed in claim 15, wherein said output limit indication circuit in each said converter control unit receives the converter-side terminal voltage of said transformer as at least one input thereto, and its output signal varies in such a direction as to increase the control angle limit for said thyristor converter with a decrease in said terminal voltage.

18. A DC power transmission control apparatus as claimed in claim 14, wherein said output limit indication circuit in each said converter control unit receives the converter-side terminal voltage of said transformer and the DC current in said transmission system as its inputs, and its output signal varies in such a direction as to increase the control angle limit for said thyristor converter with a decrease in said terminal voltage and also with a decrease in said current.

19. A DC power transmission control apparatus as claimed in claim 15, wherein said output limit indication circuit in each said converter control unit receives the converter-side terminal voltage of said transformer and the DC current in said transmission system as its inputs, and its output signal varies in such a direction as to increase the control angle limit for said thyristor converter with a decrease in said terminal voltage and also with a decrease in said current.

20. A DC power transmission control apparatus comprising a DC power transmission system connecting by way of a power transmission line between a DC terminal of a first thyristor converter operating as a forward converter and a DC terminal of a second thyristor converter operating as a reverse converter, an AC system connected to an AC terminal of each said thyristor converter through a transformer, and a converter control unit provided for each said thyristor converter and comprising a plurality of control circuits, a signal selection circuit selecting one of the output signals of said control circuits, and a phase shift circuit firing said thyristor converter with the phase determined by the output signal of said signal selection circuit, wherein each said converter control unit further comprises an output limit indication circuit receiving the converter-side terminal voltage of said transformer and the DC current in said transmission system as its inputs and generating an output signal which varies in such a direction as to increase the control angle limit for said thyristor converter with a decrease in said current, said signal selection circuit receiving the output signal of said output limit indication circuit together with the output signals of said control circuits controlling the operation of said thyristor converter as its inputs and selecting such an output signal that the control advance angle or the control delay angle for said thyristor converter indicated by the signal selected by said signal selection circuit is smaller than the control angle indicated by the output signal of said output limit indication circuit, each said transformer being of the tapped construction, and a tap control unit is provided for each said tapped transformer for controlling the tap position of said transformer so as to normally maintain constant the no-load voltage at the converter-side terminal of said transformer and for changing the tap position of said transformer in response to a reactive power signal when the reactive power is to be controlled by said thyristor converter.

21. A DC power transmission control apparatus comprising a DC power transmission system connecting by way of a power transmission line between a DC terminal of a first thyristor converter operating as a forward converter and a DC terminal of a second thyristor converter operating as a reverse converter, an AC system connected to an AC terminal of each said thyristor converter through a transformer, and a converter control unit provided for each said thyristor converter and comprising a plurality of control circuits including at least a control circuit generating a reactive power signal, a signal selection circuit selecting one of the output signals of said control circuits, and a phase shift circuit firing said thyristor converter with the phase determined by the output signal of said signal selection circuit, wherein each said converter control unit further comprises an output limit indication circuit generating an output signal indicative of a control advance angle or a control delay angle required for maintaining constant the damper loss of said thyristor converter and applying this output signal as an additional input to said signal selection circuit, said signal selection circuit selecting the output signal of said reactive power signal generating control circuit during the reactive power control so that the control advance angle or the control delay angle indicated by the signal selected by said signal selection circuit may not become larger than the control angle indicated by the output signal of said output limit indication circuit, each said transformer being of the tapped construction, and the tap position of said transformer is changed so as to decrease the converter-side terminal voltage of said transformer when the reactive power is to be controlled by said thyristor converter.

22. A DC power transmission control apparatus as claimed in claim 21, wherein said output limit indication circuit in each said converter control unit receives the converter-side terminal voltage of said transformer as at least one input thereto, and its output signal varies in such a direction as to increase the control angle limit for said thyristor converter with a decrease in said terminal voltage.

23. A DC power transmission control apparatus as claimed in claim 21, wherein said output limit indication circuit in each said converter control unit receives the converter-side terminal voltage of said transformer and the DC current in said transmission system as its inputs, and its output signal varies in such a direction as to increase the control angle limit for said thyristor converter with a decrease in said terminal voltage and also with a decrease in said current.

24. A DC power transmission control apparatus as claimed in claim 1, wherein the application of the output signal of said output limit indication circuit to said signal selection circuit is inhibited during the start-stop stage or during the stage of gate shift for protecting said thyristor converter in the event of system failure.

25. A DC power transmission control apparatus as claimed in claim 13, wherein the application of the output signal of said output limit indication circuit to said signal selection circuit is inhibited during the start-stop stage or during the stage of gate shift for pretecting said thyristor converter in the event of system failure.

26. A DC power transmission control apparatus as claimed in claim 14, wherein the application of the output signal of said output limit indication circuit to said signal selection circuit is inhibited during the start-stop stage or during the stage of gate shift for protecting said thyristor converter in the event of system failure.

27. A DC power transmission control apparatus as claimed in claim 20, wherein the application of the output signal of said output limit indication circuit to said signal selection circuit is inhibited during the start-stop stage or during the stage of gate shift for protecting said thyristor converter in the event of system failure.

28. A DC power transmission control apparatus as claimed in claim 21, wherein the application of the output signal of said output limit indication circuit to said signal selection circuit is inhibited during the start-stop stage or during the stage of gate shift for pretecting said thyristor converter in the event of system failure.

29. A DC power transmission control apparatus as claimed in claim 2, wherein the current setting signal applied to said constant-current control circuit in said converter control unit associated with said forward converter is determined on the basis of the difference between the active power setting signal and the detected actual active power, and the voltage setting signal applied to said constant-voltage control circuit in said converter control unit, associated with said reverse converter is made variable during the reactive power control.

* * * * *